(12) United States Patent
Bariant et al.

(10) Patent No.: US 10,345,813 B2
(45) Date of Patent: Jul. 9, 2019

(54) METHOD FOR THE AT LEAST SEMI-AUTONOMOUS MANOEUVRING OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventors: Jean-Francois Bariant, Bietigheim-Bissingen (DE); Nicole Wagemann, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/501,742

(22) PCT Filed: Aug. 4, 2015

(86) PCT No.: PCT/EP2015/067891
§ 371 (c)(1),
(2) Date: Feb. 3, 2017

(87) PCT Pub. No.: WO2016/020355
PCT Pub. Date: Feb. 11, 2016

(65) Prior Publication Data
US 2017/0227967 A1    Aug. 10, 2017

(30) Foreign Application Priority Data
Aug. 5, 2014 (DE) .......................... 10 2014 111 122

(51) Int. Cl.
*G05D 1/02* (2006.01)
*B62D 15/02* (2006.01)
(Continued)

(52) U.S. Cl.
CPC ............ *G05D 1/0212* (2013.01); *B60W 30/06* (2013.01); *B60W 30/08* (2013.01); *B60W 30/09* (2013.01);
(Continued)

(58) Field of Classification Search
CPC ...... B60W 30/06; B60W 30/09; B60W 30/08; B62D 15/0285; G05D 1/0212; G08G 1/168; G08G 1/16
See application file for complete search history.

(56) References Cited

U.S. PATENT DOCUMENTS

2009/0312912 A1* 12/2009 Braegas .................... B60T 7/22
701/42
2013/0335553 A1* 12/2013 Heger ................ B62D 15/0285
348/118

FOREIGN PATENT DOCUMENTS

DE    10 2008 027779 A1    12/2009
DE    10 2009 040373 A1    4/2011
(Continued)

OTHER PUBLICATIONS

International Search Report issued in PCT/EP2015/067891, dated Jan. 22, 2016 (3 pages).
(Continued)

Primary Examiner — Adam R Mott
(74) Attorney, Agent, or Firm — Osha Liang LLP

(57) ABSTRACT

The invention relates to a method for the at least semi-autonomous maneuvering of a motor vehicle (1), in which a relative position between the motor vehicle (1) and at least one object (10, 11) in a surrounding area (7) of the motor vehicle (1) is detected by means of a sensor device (9) of the motor vehicle (1), a travel trajectory (12) for travel of the motor vehicle (1) past the at least one object (10, 11) is determined on the basis of the detected relative position, and a collision distance, which describes a distance between the
(Continued)

motor vehicle (1) and the at least one object (10, 11) during the travel along the determined travel trajectory (12), is determined, wherein before the travel of the motor vehicle (1) along the travel trajectory (12) an uncertainty area (a, a') is determined between the motor vehicle (1) and the at least one object (10, 11), and the collision distance is adjusted as a function of the determined uncertainty area (a, a'), and the travel of the motor vehicle (1) along the travel trajectory (12) is controlled as a function of the adjusted collision distance.

15 Claims, 5 Drawing Sheets

(51) Int. Cl.
*B60W 30/08* (2012.01)
*G08G 1/16* (2006.01)
*B60W 30/06* (2006.01)
*B60W 30/09* (2012.01)

(52) U.S. Cl.
CPC .......... *B62D 15/0285* (2013.01); *G08G 1/16* (2013.01); *G08G 1/168* (2013.01)

(56) References Cited

FOREIGN PATENT DOCUMENTS

| | | | |
|---|---|---|---|
| DE | 10 2010 002105 A1 | 8/2011 |
| DE | 10 2010 023164 A1 | 12/2011 |
| DE | 10 2011 077388 A1 | 12/2012 |
| DE | 10 2011 086210 A1 | 5/2013 |
| DE | 10 2012 014207 A1 | 1/2014 |
| DE | 10 2012 213899 A1 | 2/2014 |
| JP | 2000-177513 A | 6/2000 |
| JP | 2006-273122 A | 10/2006 |
| JP | 2011-136662 A | 7/2011 |
| JP | 2011-522737 A | 8/2011 |
| JP | 2013-082376 A | 5/2013 |
| JP | 2013-203348 A | 10/2013 |
| JP | 2014-034287 A | 2/2014 |
| JP | 2014137288 A | 7/2014 |

OTHER PUBLICATIONS

Written Opinion of the International Searching Authority issued in PCT/EP2015/067891, dated Jan. 22, 2016 (6 pages).
Notification of Reasons for Refusal issued in corresponding Japanese Patent Application No. 2017-506388, dated May 11, 2018 (11 pages).

* cited by examiner

METHOD FOR THE AT LEAST SEMI-AUTONOMOUS MANOEUVRING OF A MOTOR VEHICLE, DRIVER ASSISTANCE SYSTEM AND MOTOR VEHICLE

The present invention relates to a method for the at least semi-autonomous manoeuvring of a motor vehicle, in which a relative position between the motor vehicle and at least one object in a surrounding area of the motor vehicle is detected by means of a sensor device of the motor vehicle, a travel trajectory for travel of the motor vehicle past the at least one object is determined on the basis of the detected relative position, and a collision distance, which describes a distance between the motor vehicle and the at least one object during the travel along the determined travel trajectory, is determined. The invention also relates to a driver assistance system and to a motor vehicle having such a driver assistance system.

At present, the focus is in particular on driver assistance systems which assist the driver when manoeuvring the motor vehicle and, in particular, when parking the motor vehicle in a parking space. Driver assistance systems which can use corresponding sensors to detect parking spaces or free parking spaces and assist the driver during the parking process are already known from the prior art. In the case of such systems, the driver can be assisted both during longitudinal parking and during lateral parking. Furthermore, driver assistance systems are known which can move the motor vehicle semi-autonomously during a parking process. In this case, the driver assistance system performs the steering of the motor vehicle, and the driver activates the accelerator pedal and the brake. In addition, driver assistance systems are already known which permit autonomous manoeuvring of the motor vehicle.

In this respect, DE 10 2011 086 210 A1 discloses a method for assisting a driver of a motor vehicle during a driving manoeuvre with determination of a driving tube in which the motor vehicle moves during execution of the driving manoeuvre, wherein the driving manoeuvre is carried out automatically or semi-automatically. If an object is located within the driving tube, the vehicle is stopped. The driving manoeuvre is continued as soon as the object has left the driving tube. The method can be used, for example, to park the motor vehicle.

Furthermore, DE 10 2010 023 164 A1 describes a method for warning a driver of a motor vehicle of the presence of an object in the surroundings of the motor vehicle using a driver assistance system of the motor vehicle. In this context, a relative position of the object with respect to the motor vehicle is determined on the basis of data of a sensor device. Furthermore, an anticipated driving path or an anticipated driving tube of the motor vehicle is detected. The method can be applied, for example, when parking in a parking space.

Furthermore, DE 10 2008 027 779 A1 describes a method for assisting a driver of a vehicle when parking in a parking space. In this case, a possible parking space is measured, and a parking trajectory is calculated. The parking space geometry continues to be detected during the parking process and is compared with the parking space geometry detected before the start of the parking process. If the two parking space geometries differ from one another, a deviation which is present is evaluated and the parking trajectory is, if appropriate, corrected and/or newly calculated.

In addition, DE 10 2009 040 373 A1 discloses a method for carrying out an at least semi-autonomous parking process of a vehicle. Here, before the initiation of the parking process a potential parking space is sensed by a sensor device of a parking assistance system, and a parking path which is to be travelled along by the vehicle during the parking process in order to reach an end position in the parking space is determined as a function of the sensed parking space. In addition, after the initiation of the parking process, in each case a distance of the vehicle from the objects which bound the parking space is sensed, and after the predetermined correction criterion related to at least one of the distances has been satisfied the parking path is corrected.

A problem addressed by the present invention is to indicate a way in which the at least semi-autonomous manoeuvring of a motor vehicle can be carried out more reliably and more comfortably.

This problem is solved according to the invention by means of a method, by means of a driver assistance system and by means of a motor vehicle having the features as claimed in the respective independent patent claims. Advantageous embodiments of the invention are the subject matter of the dependent patent claims, of the description and of the figures.

A method according to the invention serves for the at least semi-autonomous manoeuvring of a motor vehicle. In this case, a relative position between the motor vehicle and at least one object in a surrounding area of the motor vehicle is detected by means of a sensor device of the motor vehicle. In addition, a travel trajectory for travel of the motor vehicle past the at least one object is determined on the basis of the detected relative position, and a collision distance, which describes a distance between the motor vehicle and the at least one object during the travel along the determined travel trajectory, is determined. Furthermore, before the travel of the motor vehicle along the travel trajectory, an uncertainty area is determined between the motor vehicle and the at least one object. In addition, before the travel of the motor vehicle along the travel trajectory, the collision distance is adjusted as a function of the determined uncertainty area. Finally, the travel of the motor vehicle along the travel trajectory is controlled as a function of the adjusted collision distance.

The present invention is based on the realization that in methods for the at least semi-autonomous manoeuvring of the motor vehicle which are known from the prior art the problem can arise that the motor vehicle is manoeuvred in such a way that this is uncomfortable for the driver. The reason for this is that for the longitudinal guidance of the motor vehicle usually a travel trajectory is determined which extends from a starting point to an end point. The driver assistance system calculates the speed profile up to the end point in this context in such a way, for example, that the speed is maximized but also predetermined values for the acceleration are not exceeded. Furthermore, according to the prior art for the determination of the speed profile, a collision distance, that is to say the distance between the motor vehicle and an object, is taken into account during the driving of the motor vehicle on the travel trajectory. The collision distance can also be referred to as Distance to Collision (DTC). In addition, an end point of a travel trajectory can be determined. If the distance from the object is then changed during the driving along the travel trajectory, this can lead to a situation in which the driver assistance system reduces the speed of the motor vehicle.

According to the invention there is then provision that a uncertainty area is determined between the motor vehicle and the at least one object. This uncertainty area describes, in particular, the spatial uncertainty during the determination of the relative position of the motor vehicle with respect to the at least one object. This uncertainty area is determined before the driving of the motor vehicle along the travel trajectory. The uncertainty area can be determined or predefined directly after the sensing of the relative position of the motor vehicle with respect to the object. If the at least one object bounds, for example, a parking space, the uncertainty area can be determined directly after measurement of the parking space. The uncertainty area is therefore determined before the motor vehicle is moved past the object or is moved into the parking space. Spatial uncertainty during the determination of the position and/or of the outer dimensions of the at least one object can be taken into account by means of the uncertainty area. Furthermore, during the determination of the uncertainty area it is possible to take into account spatial uncertainty during the determination of the position of the motor vehicle. The position of the motor vehicle is determined, for example, by means of odometry. In this context, an accumulated error can arise during the odometry, after the object or the position of the object has been sensed. During the determination of the uncertainty area it is also possible to take into account the fact that spatial uncertainty can arise during the determination of the relative position between the motor vehicle and the object by virtue of the fact that the position of the object and/or of the motor vehicle is determined on the basis of a sensor model which is subsequently processed in a map of the surroundings. The determined collision distance between the motor vehicle and the object is adjusted to the uncertainty area before the travel of the motor vehicle along the travel trajectory. Furthermore, the motor vehicle is manoeuvred along the detected travel trajectory as a function of the adjusted collision distance. In this way, the movement of the motor vehicle can be controlled in an area in which it can be assumed with a high probability that no collision with the object will occur. It is therefore also possible to prevent the collision distance between the motor vehicle and the object from undershooting a predetermined minimum value, which leads, under certain circumstances, to a situation in which the speed or acceleration of the motor vehicle is abruptly reduced. Therefore, at least semi-autonomous manoeuvring along the travel trajectory can be made possible, which the driver experiences as comfortable. The method can serve, in particular, for parking and/or for manoeuvring the motor vehicle.

The uncertainty area is preferably determined on the basis of the type of the sensor device, a current speed of the motor vehicle during the detection of the relative position between the motor vehicle and the at least one object and/or on the basis of the detected relative position between the motor vehicle and the at least one object. The sensor device can comprise at least one distance sensor with which the distance between the motor vehicle and the object can be sensed. In addition, the sensor device can be configured to determine outer dimensions of the at least one object. The sensor device can comprise, for example, at least one ultrasonic sensor, at least one camera, at least one radar sensor and/or at least one laser sensor. Depending on the configuration of the sensor, different measuring accuracies occur, for example, during the sensing of the position and/or of the dimensions of the object. These measuring accuracies can be taken into account during the determination of the uncertainty area. Furthermore, the relative position and/or the relative speed of the motor vehicle with respect to the object can be taken into account during the sensing of the object. The uncertainty area can therefore be determined particularly reliably.

In one embodiment, the relative position between the motor vehicle and the at least one object is detected continuously during the travel of the motor vehicle along the travel trajectory, and the uncertainty area is adjusted as a function of the detected relative position. During the travel along the detected travel trajectory, the driver assistance system usually receives relatively precise information which describes the at least one object. For example, the position of the object and/or the outer dimensions of the object can be determined more precisely as the motor vehicle approaches the object. The uncertainty area can therefore be adjusted continuously on the basis of this information.

The collision distance is preferably additionally adjusted on the basis of external dimensions of the motor vehicle and a predetermined safety distance. During the determination of the collision distance between the motor vehicle and the at least one object, the outer dimensions of the motor vehicle can be taken into account, said outer dimensions being stored, for example, in a memory unit of the driver assistance system. A safety distance can be added to the outer dimensions of the motor vehicle during the determination of the relative position between the motor vehicle and the object. In this way, in addition to the uncertainty area it is possible to take into account the safety distance when determining the collision distance.

In a further refinement, a remaining distance, which describes a distance between the motor vehicle when the adjusted collision distance is reached and an end point of the detected travel trajectory, is detected. In particular, the remaining distance constitutes the shortest distance between the motor vehicle when the collision distance is reached and the end point of the travel trajectory. In this context, the travel trajectory is preferably detected on the basis of the relative position of the object with respect to the motor vehicle. The uncertainty area is therefore not taken into account during the determination of the travel trajectory. The adjusted collision distance is, however, determined on the basis of the uncertainty area. The remaining distance from the end point can therefore be determined in such a way that there is no risk of a collision with the at least one object.

In addition it is advantageous if a speed profile for the travel of the motor vehicle along the detected travel trajectory is determined as a function of the detected remaining distance. By virtue of the fact that the remaining distance is detected taking into account the uncertainty area and/or the safety distance, it is possible to assume with a high probability that there is no risk of a collision with the object during the movement of the motor vehicle along the travel trajectory. Therefore, the speed profile along the travel trajectory can be determined in such a way that the travel is experienced as comfortable and safe by the vehicle occupants.

A model, which describes the travel of the motor vehicle along the travel trajectory, is preferably determined, and the collision distance is additionally adjusted as a function of the determined model. By means of a model it is possible to take into account the fact that during the at least semi-autonomous manoeuvring the motor vehicle does not, under certain circumstances, move precisely along the determined travel trajectory. The model can be, in particular, a dynamic model which describes the movement of the motor vehicle. Therefore, deviations of the motor vehicle from the travel trajectory can be taken into account by means of the model and used during the determination of the collision distance. The relative position of the motor vehicle during the movement along the travel trajectory can therefore be determined precisely.

In a further refinement, a position of the motor vehicle during the travel along the detected travel trajectory is determined, and the remaining distance is adjusted on the basis of the determined position of the motor vehicle. The position of the motor vehicle can be determined, for example, by means of odometry. For this purpose, the number of the revolutions of at least one wheel of the motor vehicle and/or a steering angle during the movement of the motor vehicle along the travel trajectory can be sensed. In this way, the remaining distance can be detected reliably.

In addition, it is advantageous if the travel trajectory is determined in such a way that during the travel along the travel trajectory the motor vehicle carries out at least one change of direction of travel, and a distance from a point on the travel trajectory at which the change of direction of travel is carried out is detected. In particular, during parking processes the travel trajectory can be determined in such a way that during the movement along the travel trajectory the motor vehicle carries out a change of direction of travel, that is to say a change between reverse travel to forward travel, or vice versa. Through the outputting of the point it is possible to determine precisely the movement of the motor vehicle along the travel trajectory.

A speed profile for the travel of the motor vehicle along the detected travel trajectory is preferably additionally determined as a function of the detected distance from the point. The distance of the motor vehicle from the point on the travel trajectory, on reaching which the change of direction of travel is carried out, is output. On the basis of this distance, the speed profile of the motor vehicle from the current position to the point can be detected in such a way that a comfortable and safe driving sensation is obtained for the vehicle occupants.

In a further embodiment, a further object is additionally sensed in the surrounding area of the motor vehicle, and it is checked whether a current position of the further object is located within the uncertainty area. During the movement of the motor vehicle, further objects can be detected or sensed with the sensor device. Such further objects can be, for example, pedestrians who are moving between the motor vehicle and the at least one object. The further objects can also be objects which have not previously been sensed. If the further object is not located within the uncertainty area, the movement of the motor vehicle can be adjusted. Alternatively or additionally, the travel trajectory can be adjusted. In this way, the motor vehicle can be safely manoeuvred.

Furthermore, it is advantageous if, in order to control the travel of the motor vehicle along the travel trajectory as a function of the adjusted collision distance, an intervention is made into a steering system, a brake system and/or a drive engine. In order to move the motor vehicle along the travel trajectory it is possible, for example, for a driver assistance system of the motor vehicle to carry out a steering intervention. In this case, the driver assistance system performs the lateral guidance of the motor vehicle. The driver continues to activate the accelerator pedal and the brake. It is also possible to provide that the driver assistance system additionally actuates a brake and/or a drive engine of the motor vehicle, in order to manoeuvre the motor vehicle along the travel trajectory. In this case, the driver assistance system also performs the longitudinal guidance of the motor vehicle.

In a further embodiment, during the travel along the travel trajectory the motor vehicle is moved into a parking space for the purpose of lateral parking or into a parking space for the purpose of longitudinal parking. In this case, the at least one object bounds a parking space. This parking space can serve for laterally parking the motor vehicle. Alternatively to this, the parking space can serve for longitudinally parking the motor vehicle. In this way, the driver can be assisted during the parking of the motor vehicle. It is also possible to provide that the motor vehicle is manoeuvred along the travel trajectory in order to remove it from a parking space.

A driver assistance system according to the invention is designed to carry out a method according to the invention. The driver assistance system preferably comprises a sensor device for detecting a position of an object, wherein the sensor device has at least one ultrasonic sensor, at least one camera, at least one radar sensor and/or at least one laser sensor. In this way, it is possible to reliably determine the relative position with respect to the object with the sensor device or with corresponding distance sensors.

A motor vehicle according to the invention comprises a driver assistance system according to the invention. The motor vehicle is embodied, in particular, as a passenger car.

Embodiments which are presented with respect to the method according to the invention, and the advantages thereof, apply correspondingly to the driver assistance system according to the invention and to the motor vehicle according to the invention.

Further features of the invention can be found in the claims, the figures and the description of the figures. All the features and combinations of features specified above in the description and the features and combinations of features which are specified below in the description of the figures and/or merely shown in the figures can be used not only in the respectively specified combination but also in other combinations or else alone.

The invention will now be explained in more detail on the basis of a preferred exemplary embodiment and with reference to appended drawings, of which:

Figure 1:
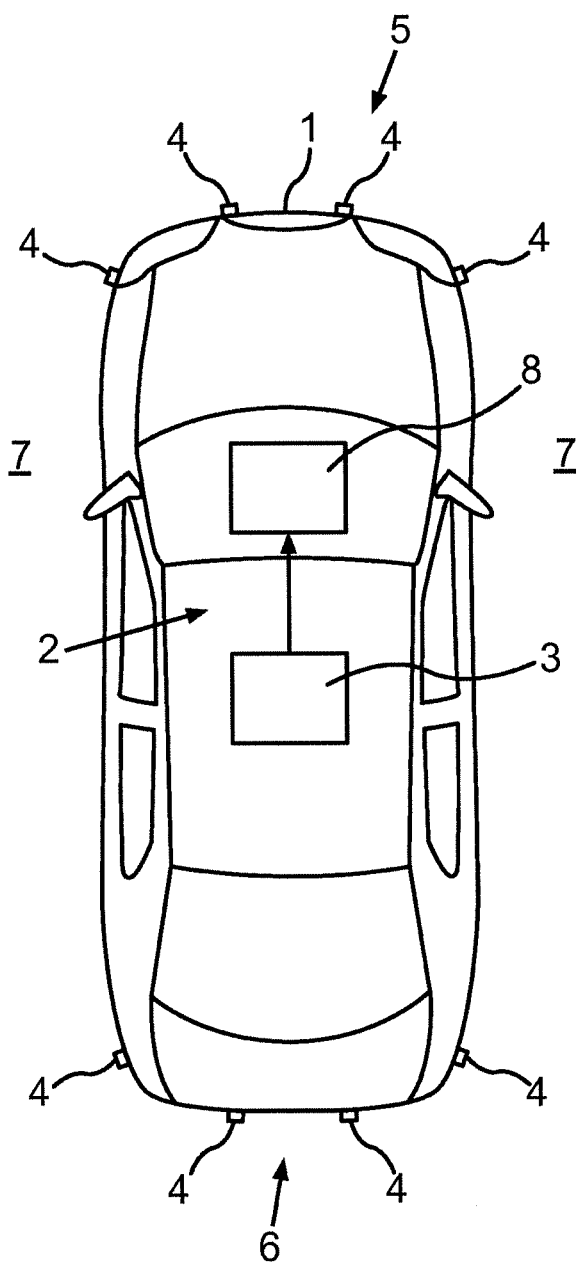
FIG. 1 shows a schematic illustration of a motor vehicle according to an embodiment of the invention.

FIG. 1 shows a motor vehicle according to an embodiment of the present invention. The motor vehicle 1 is embodied as a passenger car in the present exemplary embodiment. The motor vehicle 1 comprises a driver assistance system 2. The driver assistance system 2 in turn comprises a control device 3, which can be formed, for example, by a control unit of the motor vehicle 1. Furthermore, the driver assistance system 2 comprises a sensor device 9.

In the present exemplary embodiment, the sensor device 9 comprises eight distance sensors 4. In this context, four distance sensors 4 are arranged in a front area 5 of the motor vehicle 1 and four distance sensors 4 are arranged in a rear area 6 of the motor vehicle 1. The distance sensors 4 are designed, in particular, to sense an object 12 in a surrounding area 7 of the motor vehicle 1. Furthermore, the distance sensors 4 are configured to determine a distance from at least one object 10, 11 in the surrounding area 7 of the motor vehicle 1. The distance sensors 4 can be embodied, for example, as ultrasonic sensors, radar sensors, laser scanners, cameras or the like. Furthermore, it is also possible to provide that further distance sensors are arranged, for example, on an outer side area of the motor vehicle 1.

Moreover, the motor vehicle 1 comprises a drive device 8. The drive device 8 can serve to actuate a drive train of the motor vehicle 1. In particular, a drive engine and/or a brake system of the motor vehicle 1 can be actuated with the drive device 8. Furthermore, it is possible to provide that a steering system of the motor vehicle 1 is actuated by means of the drive device 8. The control device 3 is connected to the distance sensors 4 for the transmission of data. Corresponding data lines are not illustrated here for the sake of clarity. Moreover, the control device 3 is connected to the drive device 8 for the transmission of data.

At least one object 10, 11 in the surrounding 7 of the motor vehicle 1 can be sensed with the distance sensors 4. In addition, the distance from the object 10, 11 can be determined. For this purpose, for example a signal can be emitted with at least one of the distance sensors 4, and the signal which is reflected from the object can be received again. The distance from the object 10, 11 can be determined on the basis of the transit time of the signal by means of the control device 3. The driver assistance system 2 can additionally detect the current position of the motor vehicle 1. For this purpose, the signals of a satellite-supported position-determining system can be taken into account. Furthermore, the current position of the motor vehicle 1 can be determined by means of odometry. For this purpose, for example the revolutions of at least one wheel of the motor vehicle 1 and/or a steering angle of the motor vehicle can be detected. The relative position of the motor vehicle 1 with respect to the object 10, 11 can be detected on the basis of the current position of the motor vehicle 1 and of the distance between the motor vehicle 1 and the object 10, 11.

Moreover, the control device 3 is designed to calculate a travel trajectory 12 of the motor vehicle 1, which travel trajectory 12 describes a collision-free movement of the motor vehicle 1 past the object 10, 11. For this purpose, the outer dimensions of the motor vehicle 1, such as, for example those stored in a memory unit of the control device 3, can also be taken into account. By means of the driver assistance system 2, the motor vehicle 1 can be moved semi-autonomously along the travel trajectory 12. In this case, the steering is performed by the driver assistance system 2. The driver also activates the accelerator pedal and the brake. As an alternative to this, the motor vehicle 1 can also be moved autonomously along the travel trajectory 12. In this context, the driver assistance system 2 also controls the drive and the brake of the motor vehicle 1.

The driver assistance system 2 and the control device 3 are additionally configured to determine the speed profile for the travel along the travel trajectory 12, that is to say from a starting point to an end point of the travel trajectory 12. If the motor vehicle 1 is moved along the travel trajectory 12, the motor vehicle 1 can approach the at least one object 10, 11. In this case, a collision distance between the motor vehicle 1 and the object 10, 11 can undershoot a threshold value. The collision distance describes the distance between the area of the motor vehicle 1 with which there is a risk of a collision with the object 10, 11 during the travel along the travel trajectory 12 and the at least one object 10, 11. If the threshold value for the collision distance is undershot, the speed of the motor vehicle 1 can be automatically reduced by the driver assistance system 2. This can result in the driver experiencing the travel along the travel trajectory 12 as uncomfortable or unsafe.

Figure 2:
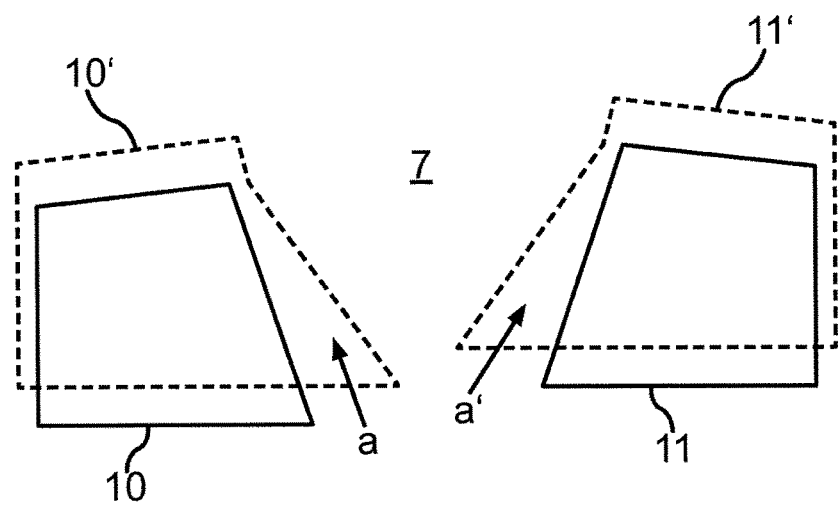
FIG. 2 shows a schematic illustration of two objects in a surrounding area of the motor vehicle and a respective uncertainty area.

FIG. 2 shows a plan view of a first object 10 and of a second object 11 which are located in the surrounding area 7 of the motor vehicle 1. The two objects 10, 11 can bound, for example, a parking space. The outer dimensions of the objects 10, 11 are determined on the basis of the sensor data of the distance sensors 4 by means of the control device 3. When the objects 10, 11 are sensed with the distance sensors 4, measuring inaccuracies usually arise. These measuring inaccuracies can be attributable to the type of distance sensor 4 or the measuring principle. Furthermore, the position of the motor vehicle 1 with respect to the objects 10, 11 can play a role during the sensing of the objects 10, 11 and/or the current speed of the motor vehicle 1 can play a role during the sensing of the objects 10, 11. These influencing factors are taken into account by the fact that a respective uncertainty area a, a' is taken into account between the motor vehicle 1 and the objects 10, 11. The uncertainty area a or a' can, as it were, surround the objects 10, 11. The uncertainty area a with respect to the first object 10 results in a first safety object 10'. The uncertainty area a' with respect to the second object 11 results in a second safety object 11'. The uncertainty area a is determined before the motor vehicle 1 is manoeuvred along the travel trajectory 12. The collision distance is adjusted on the basis of the uncertainty area a, a' or on the basis of the safety objects 10' and 11'. The travel trajectory 12 along which the motor vehicle 1 is moved past the objects 10, 11 can then be determined on the basis of the adjusted collision distance.

Figure 3:
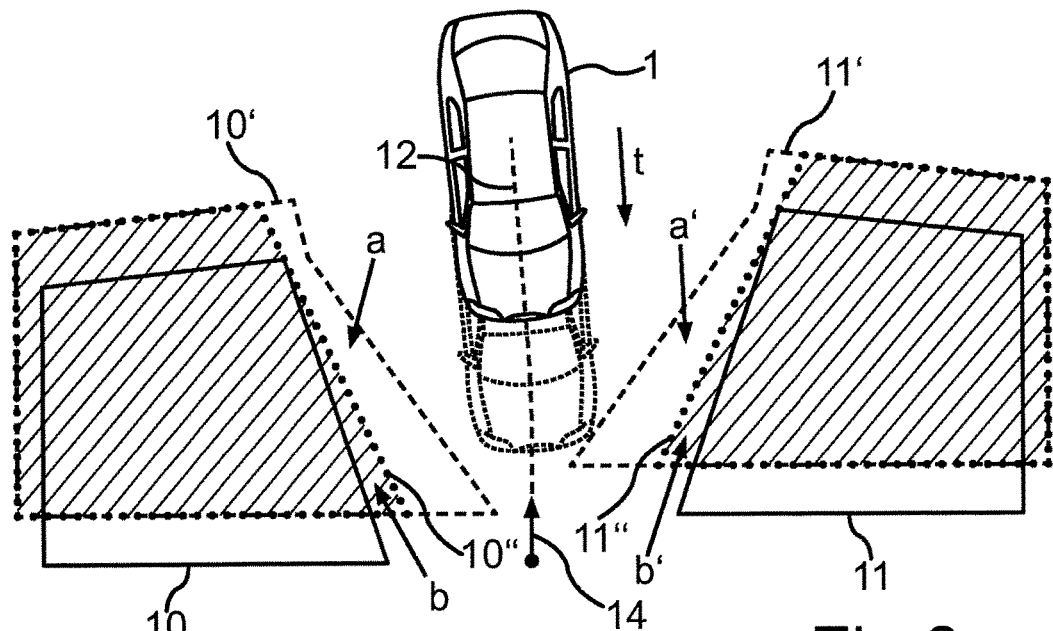
FIG. 3 shows a movement of the motor vehicle with respect to the two objects according to FIG. 2.

In addition, according to a further embodiment there can be provision that the uncertainty areas a, a' or the safety objects 10', 11' are adjusted during the travel of the motor vehicle 1 along the travel trajectory 12. This is illustrated in FIG. 3. If the motor vehicle 1 is moved toward the objects 10, 11 as a function of the time t, the objects 10, 11 can be sensed more precisely by means of the distance sensors 4. As a result it becomes possible to adjust the uncertainty areas a, a' or the safety objects 10', 11' correspondingly. This results in the adjusted uncertainty areas b and b' or the adjusted safety objects 10" and 11". The adjusted safety objects 10" and 11" are illustrated with hatching in FIG. 3. It is apparent that the adjusted safety objects 10" and 11" have, compared to the safety objects 10' and 11', a relatively small spatial extent in the area which is between the two objects 10 and 11 and faces away from the motor vehicle 1. The reason for this is that this area cannot be sensed more precisely until the motor vehicle 1 approaches the objects 10, 11, and the adjusted uncertainty area b or b' can therefore also be selected to be smaller compared to the uncertainty areas a, a'.

The driver assistance system 2 can determine whether there is a risk of a collision with one of the objects 10, 11. For this purpose, the driver assistance system 2 can determine the collision distance. The respective uncertainty areas a, a' or the adjusted uncertainty areas b, b' are taken into account during the calculation of the collision distance. The driver assistance system 2 can therefore also detect a remaining distance 14 which represents an area in which there is a high probability of no collision occurring between the motor vehicle 1 and one of the objects 10, 11. The remaining distance 14 represents, in particular, the shortest distance between the position of the motor vehicle 1 when the minimum collision distance is reached and the end point of the travel trajectory 12. The remaining distance 14 is therefore detected as a function of the uncertainty areas a, a' or the adjusted uncertainty areas b, b'. The travel trajectory 12 is, however, detected on the basis of the objects 10, 11.

Figure 4:
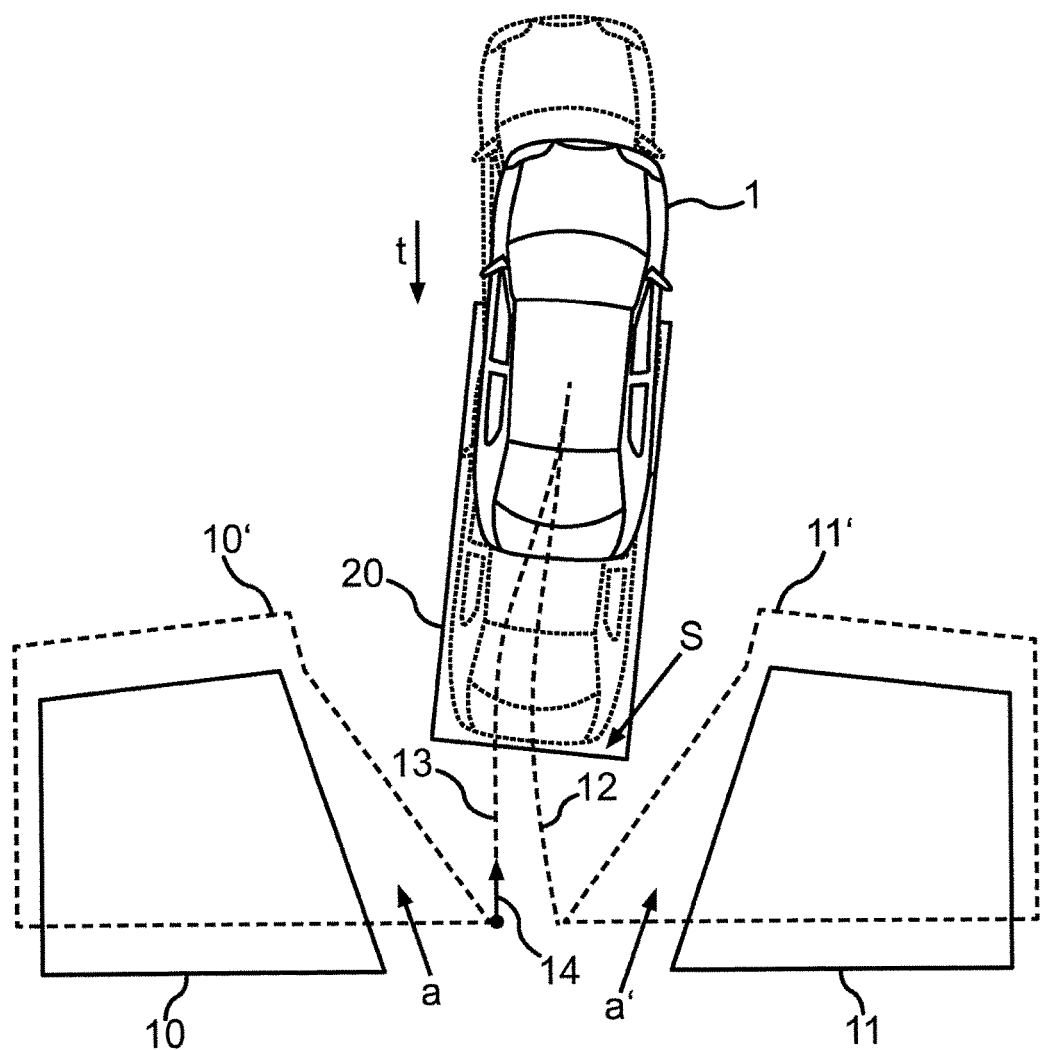
FIG. 4 shows a movement of the motor vehicle with respect to the two objects according to FIG. 2 in a further embodiment.

FIG. 4 shows a further exemplary embodiment. In this case, the motor vehicle 1 is moved rearward between the two objects 10, 11. In this case, a safety distance S is taken into account in addition to the outer dimensions of the motor vehicle 1. Here, the safety distance S is selected in such a way that the motor vehicle 1 is considered to be a rectangle 20. The safety distance S is taken into account here in addition to the uncertainty areas a, a' during the calculation of the collision distance and/or the remaining distance 14.

The remaining distance 14 is determined as a function of the travel trajectory 12. Deviations can occur during the movement of the motor vehicle 1 along the travel trajectory 12. These can arise, for example, as a result of the fact that the steering system of the motor vehicle 1 does not follow the steering angle which is predefined by the driver assistance system 2. In order to take into account this deviation, a dynamic model of the motor vehicle 1 can be used. In this context, it is also possible to provide that the remaining distance 14 is calculated by virtue of the fact that the travel trajectory 12 is projected onto the currently detected position of the motor vehicle 1, which position is determined, for example, by means of odometry. This results in the projected or adjusted travel trajectory 13 on the basis of which the remaining distance 14 is determined.

Figure 5:
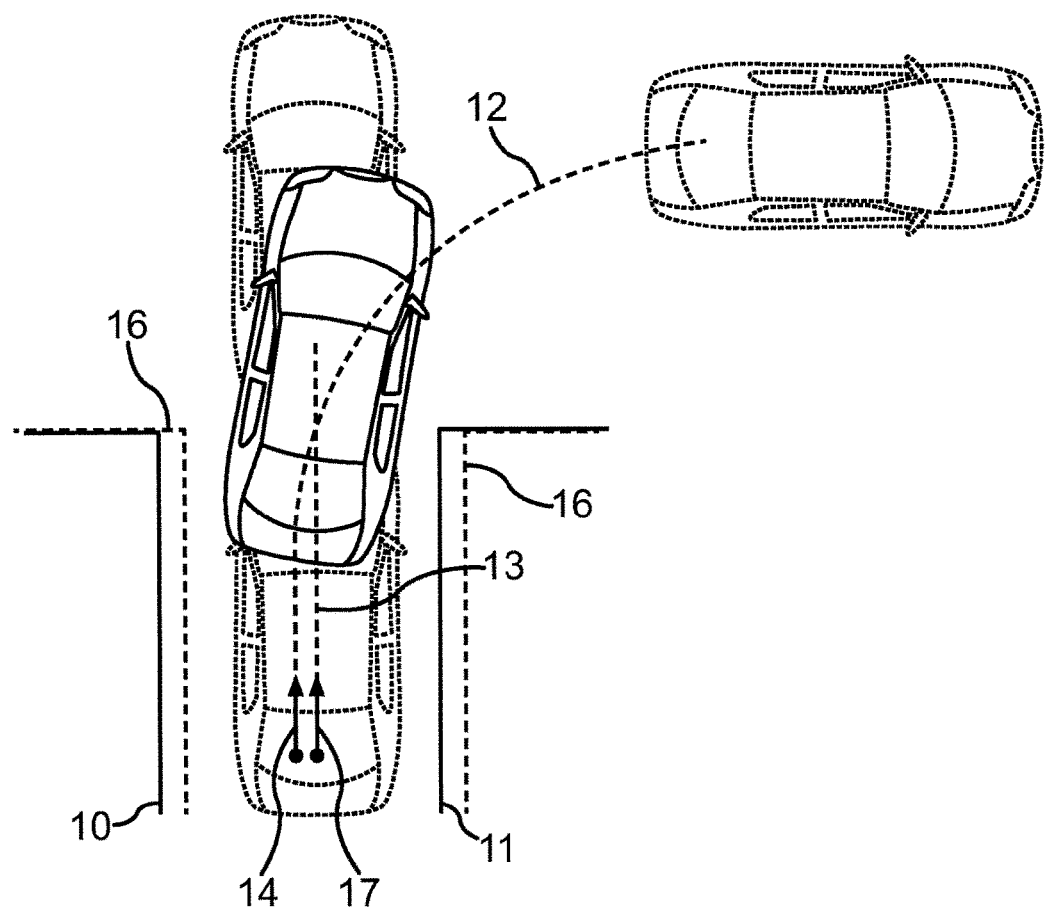
FIG. 5 shows a movement of the motor vehicle with respect to two objects, wherein the motor vehicle carries out a change of direction of travel.

FIG. 5 shows a further exemplary embodiment in which the motor vehicle 1 is moved rearward between the two objects 10, 11. The two objects 10, 11 can bound, for example, a parking space. In this case, the travel trajectory 12 is determined in such a way that during the travel along the travel trajectory 12 the motor vehicle 1 carries out a change in direction of travel. In addition, the position of the two objects 10, 11 is corrected, with the result that the adjusted boundary lines 16 are produced. When the objects 10, 11 are newly measured, the problem can arise that although the travel along the originally planned travel trajectory 12 would not bring about a collision with any of the objects 10, 11, the target position during the travel cannot be reached along the travel trajectory 12. In this case, there is a need for a change in the travel trajectory 12.

In the exemplary embodiment according to FIG. 5, it may also be the case that the driver assistance system 2 carries out the change of direction of travel earlier than planned, in order to reduce the duration of the driving manoeuvre. This can also be carried out when the further travel along the travel trajectory 12 is collision-free. In this case, the distance between the current position of the motor vehicle 1 and the point on the travel trajectory 12 at which the change in direction of travel takes place can be output by the driver assistance system 2. Here, the drive device of the motor vehicle 1 can be actuated by the driver assistance system 2 in such a way that the motor vehicle 1 is moved up to the point or further along the travel trajectory 12 if there is no risk of a collision. The motor vehicle 1 should be stopped as early as possible, but comfortably. The motor vehicle 1 can be moved on the adjusted travel trajectory 13. In the present example, the remaining distance 14 on the travel trajectory and the remaining distance 17 on the adjusted travel trajectory 13 are the same.

During the travel of the motor vehicle 1 along the travel trajectory 12 it may be the case that further objects in the surrounding area 7 of the motor vehicle 1 are sensed with the distance sensors 4. This may be the case, for example, if pedestrians or other road users are located between the motor vehicle 1 and the first object 10 and/or the second object 11. It can also be the case that further objects are only sensed at a later point in time.

Figure 6:
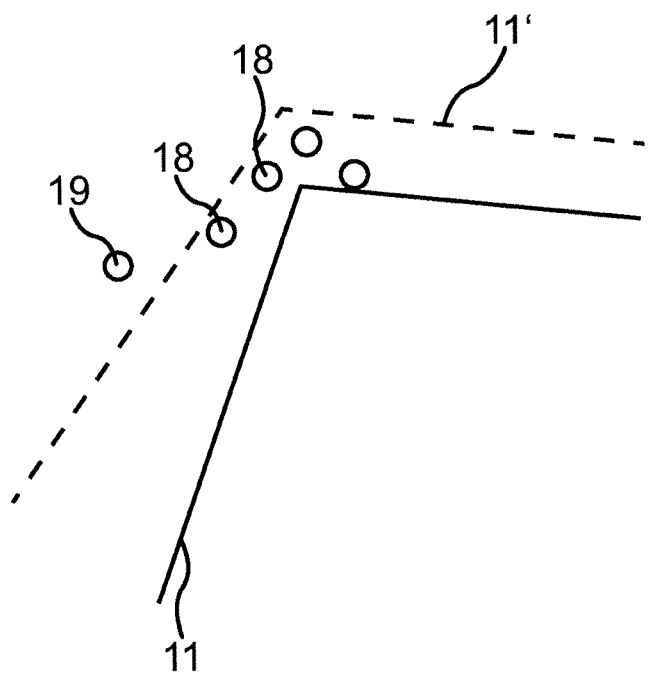
FIG. 6 shows the second object and further objects in the surrounding area of the motor vehicle.

These further objects can be assigned to corresponding features. This is clarified schematically in FIG. 6 using the example of the second object 11. In this context, a distinction is made between further objects which are located within the uncertainty area a' and further objects which are located outside the uncertainty area a'. The further objects which are located within the uncertainty area a' are grouped to form the features 18. The further objects which are located outside the uncertainty area a' are grouped to form the features 19. In this context, it is also possible to provide that a collision distance from the further objects is detected. If at least one further object is located outside the uncertainty area a', the collision distance from the further object can also be taken into account during the detection of the speed profile.

In the exemplary embodiments described above, the drive device 8 can actuate the drive train in such a way that the minimum of the remaining distance 14 is used to detect the speed profile along the travel trajectory 12. If no further objects are located between one of the objects 10, 11 and the motor vehicle 1, the driver assistance system 2 can use the remaining collision distance to determine the speed profile. During the travel along the travel trajectory 12, the collision distance will not reach any relatively small values, since the uncertainty area a, a' and/or the safety distance S has/have been taken into account during the determination of the collision distance. In this way, the motor vehicle 1 can be manoeuvred along the travel trajectory 12 in such a way that the vehicle occupants experience this as comfortable and safe.

The invention claimed is:

1. A method for the at least semi-autonomous manoeuvring of a motor vehicle, comprising:
    detecting a relative position between the motor vehicle and at least one object in a surrounding area of the motor vehicle using a sensor device of the motor vehicle;
    determining a travel trajectory for travel of the motor vehicle past the at least one object on the basis of the detected relative position;
    determining a collision distance, which describes a distance between the motor vehicle and the at least one object during the travel along the determined travel trajectory, wherein before the travel of the motor vehicle along the travel trajectory, an uncertainty area is determined between the motor vehicle and the at least one object;
    adjusting the collision distance as a function of the determined uncertainty area; and
    controlling the travel of the motor vehicle along the travel trajectory as a function of the adjusted collision distance by at least:
        determining a position of the motor vehicle along the travel trajectory where the adjusted collision distance is at a minimum; and
        determining a speed profile for the travel of the motor vehicle along the travel trajectory based on a reduced collision risk from the determined position to an end point of the travel trajectory.

2. The method according to claim 1, wherein the uncertainty area is determined on the basis of the type of the sensor device, a current speed of the motor vehicle during the detection of the relative position between the motor vehicle and the at least one object and/or on the basis of the detected relative position between the motor vehicle and the at least one object.

3. The method according to claim 1, wherein the relative position between the motor vehicle and the at least one object is detected continuously during the travel of the motor vehicle along the travel trajectory, and the uncertainty area is adjusted as a function of the detected relative position.

4. The method according to claim 1, wherein the collision distance is additionally adjusted on the basis of external dimensions of the motor vehicle and a predetermined safety distance.

5. The method according to claim 1, wherein a remaining distance, which describes a distance between the motor vehicle when the adjusted collision distance is reached and an end point of the travel trajectory, is detected.

6. The method according to claim 5, wherein a speed profile for the travel of the motor vehicle along the travel trajectory is determined as a function of the detected remaining distance.

7. The method according to claim 1, wherein a model, which describes the travel of the motor vehicle along the travel trajectory, is determined, and the collision distance is additionally adjusted as a function of the determined model.

8. The method according to claim 5, wherein a current position of the motor vehicle during the travel along the travel trajectory is determined, and the remaining distance is adjusted on the basis of the determined position of the motor vehicle.

9. The method according to claim 1, wherein the travel trajectory is detected in such a way that during the travel along the travel trajectory the motor vehicle carries out at least one change of direction of travel, and a distance from a point on the travel trajectory at which the change of direction of travel is carried out is detected.

10. The method according to claim 9, wherein a speed profile for the travel of the motor vehicle along the travel trajectory is additionally determined as a function of the detected distance from the point at which the change of direction of travel is carried out.

11. The method according to claim 1, wherein a further object is additionally sensed in the surrounding area of the motor vehicle and a determination is made as to whether a current position of the further object is located within the uncertainty area.

12. The method according to claim 1, wherein in order to control the travel of the motor vehicle along the travel trajectory as a function of the adjusted collision distance, an intervention is made into a steering system, a brake system and/or a drive engine of the motor vehicle.

13. The method according to claim 1, wherein during the travel along the travel trajectory the motor vehicle is moved into a parking space for the purpose of lateral parking or into a parking space for the purpose of longitudinal parking.

14. A driver assistance system configured to execute a method according to claim 1, comprising:
 the sensor device configured to detect the relative position between the motor vehicle and at least one object; and
 memory storing external dimensions of the motor vehicle.

15. A motor vehicle having a driver assistance system according to claim 14.

* * * * *